J. U. FIESTER.
Cooking Apparatus.
No. 35,512.
Patented June 10, 1862.
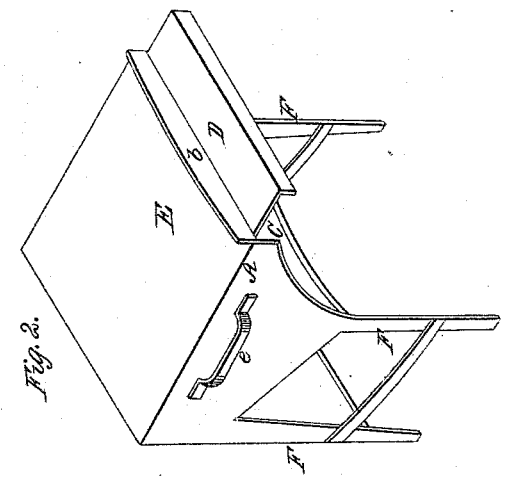
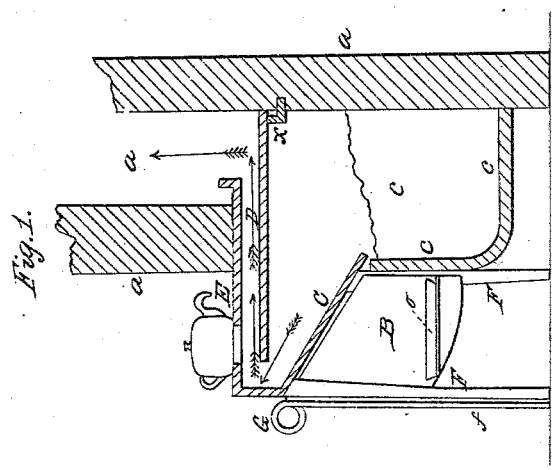
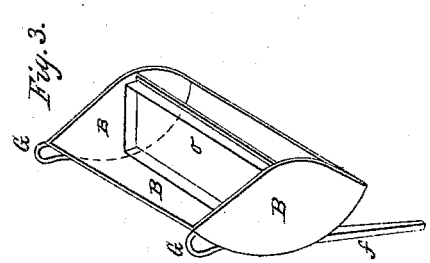
Witnesses:
John G. Baker
A. G. Wilkins
Inventor:
John U. Fiester,
by Attys.

UNITED STATES PATENT OFFICE.

JOHN U. FIESTER, OF WINCHESTER, OHIO.

IMPROVEMENT IN COOKING APPARATUS.

Specification forming part of Letters Patent No. 35,512, dated June 10, 1862.

*To all whom it may concern:*

Be it known that I, JOHN U. FIESTER, of Winchester, Guernsey county, in the State of Ohio, have invented a new and useful Cooking Apparatus for Baking, &c., before a Grate; and I do hereby declare that the following is a full and exact description thereof, reference being had to the accompanying drawings, and to the letters of reference marked thereon.

In the drawings, Figure 1 is a vertical section showing a grate and chimney with my invention applied and in operation. Fig. 2 is a perspective view of the stove. Fig. 3 is a perspective view of the baker, reflector, or kitchen with baking-pan.

To enable those skilled in the art to make and use my invention, I will describe its construction and operation.

My improvement is intended to be used with the ordinary house fire-grate, more especially where it is desirable that a family should make one fire answer the several domestic uses, such as for cooking and for warming the apartment.

In the drawings, $a$ represents the chimney, and $c$ the grate; A, the stove, having a lower plate or reflector, C, and a middle plate, D, extending to the back wall of the chimney-place. This plate does not quite extend to the front of the stove. It is turned down at the back end to catch into the iron casting at the back of the fire-place, of the Dodge, or other grate.

E is the top plate of the stove. This plate is turned up at the edge $b$, and is thereby strengthened. This plate can be made with movable plates for the inserting of a kettle, pot, &c., as in ordinary cooking-stoves.

F are the legs which support the stove, or it may be supported by resting on the grate and the hold of the plate D.

$e$ are lugs or ears by which to move the stove into and out of the grate.

B is the baker, which contains a baking-pan, $o$, and is similar in shape to the well-known tin kitchen. G are handles by which it is moved nearer to or farther from the grate, according to the heat desired. $f$ are the legs by which in part it is supported.

In using my improved baking apparatus the stove part of it is pushed into the fire-place over the grate until the middle plate, D, touches the back wall and hooks into the casting X, the stove being of such a width as to fit snugly in. The draft, being cut off from its usual course by plate D, is drawn forward and up the flue formed by plates C and D and backward in the flue formed by plates D and E, and then up the chimney, as indicated by the arrows, Fig. 1. The baker B is then pushed up to the grate under the plate C, the food to be cooked being first placed in the pan $o$. The lower portion of the grate is of course left open for draft. As the heat and draft pass under the top plate, E, it will become heated sufficiently for cooking purposes, can be taken off, and a frying-pan or kettle be put on at the same time that the baker is in use. The food in the baker will be cooked in part by the direct rays of heat from the front of the grate and in part by the heat reflected down into the pan from the plate C.

What I claim as new, and desire to secure by Letters Patent, is—

The combination and arrangement of the top plate, E, middle plate, D, lower plate, C, and baker B, so as to form an improved apparatus for cooking before grates, constructed and operating substantially in the manner and for the purposes set forth.

JOHN U. FIESTER.

Witnesses:
SIMEON BROWN,
H. A. JOHNSON.